Aug. 13, 1963 W. H. LOCKWOOD 3,100,582
TIERABLE AND NESTABLE RECEPTACLE
Filed Jan. 4, 1960 8 Sheets-Sheet 1

INVENTOR.
WARREN H. LOCKWOOD
BY
Meyer, Baldwin, Doran & Young
ATTORNEYS

Aug. 13, 1963    W. H. LOCKWOOD    3,100,582
TIERABLE AND NESTABLE RECEPTACLE
Filed Jan. 4, 1960    8 Sheets-Sheet 2

INVENTOR.
WARREN H. LOCKWOOD
BY
Meyer, Baldwin, Doran & Young
ATTORNEYS

Aug. 13, 1963

W. H. LOCKWOOD

3,100,582

TIERABLE AND NESTABLE RECEPTACLE

Filed Jan. 4, 1960

INVENTOR.
WARREN H. LOCKWOOD
BY
Meyer, Baldwin, Doran & Young
ATTORNEYS

Aug. 13, 1963 W. H. LOCKWOOD 3,100,582
TIERABLE AND NESTABLE RECEPTACLE
Filed Jan. 4, 1960 8 Sheets-Sheet 4

INVENTOR.
WARREN H. LOCKWOOD
BY
Meyer, Baldwin, Doran & Young
ATTORNEYS

Aug. 13, 1963 W. H. LOCKWOOD 3,100,582
TIERABLE AND NESTABLE RECEPTACLE
Filed Jan. 4, 1960 8 Sheets-Sheet 6

INVENTOR
WARREN H. LOCKWOOD
BY
*Meyer, Baldwin, Doran & Young*
ATTORNEYS

Aug. 13, 1963    W. H. LOCKWOOD    3,100,582
TIERABLE AND NESTABLE RECEPTACLE
Filed Jan. 4, 1960    8 Sheets-Sheet 8

INVENTOR.
WARREN H. LOCKWOOD
BY
Meyer, Baldwin, Doran & Young
ATTORNEYS

| United States Patent Office | 3,100,582
Patented Aug. 13, 1963 |

3,100,582
TIERABLE AND NESTABLE RECEPTACLE
Warren H. Lockwood, Downey, Calif.
(1329 Granvia Altamira, Palos Verdes Estates, Calif.)
Filed Jan. 4, 1960, Ser. No. 365
8 Claims. (Cl. 220—97)

This invention relates to improvements in a receptacle or tray and more particularly to that type adapted to be tiered when in use and to be nested when empty.

Whenever in the specification and claims these trays or receptacles are referred to as "tray" or "receptacle," it is intended that either term includes crates, boxes, baskets, trays, skids, pallets, flats, knock-down shelving, and similar receptacles or article carrying devices which may be stacked one upon another when in use and nested when empty for conservation of space.

One of the objects of the present invention is to provide a tierable and nestable receptacle having no moving parts, having rigidly connected upper and lower tiering support portions for a tiering position and being sequentially movable in a horizontally shiftable and a downward direction into a nesting position from this tiering position.

A further object of the present invention is to provide a tierable and nestable receptacle having side wall portions spaced apart in one horizontal direction; having contiguous to each of these side wall portions an upper group and a lower group of tiering support portions and clearway recesses for one group of these support portions located contiguous to either the upper or lower edges of the side wall portion for permitting movement between tiering and nesting positions by a horizontal linear shifting movement, extending generally parallel to the side wall portions, and a downward movement into nesting position.

A further object of the present invention is to provide a receptacle characterized by its inexpensive manufacturing cost, ease of assembly of its component parts, structural simplicity, strong and sturdy nature, compactness in nesting relationship with like receptacles, multiplicity of functional advantages, and/or ease of assembly with like receptacles in either tiering or nesting position.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 29 is a perspective view of a twelfth form of receptacle representing a modification of the eleventh form of receptacle shown in FIG. 26; while FIG. 30 is a side elevational view of the receptacle in FIG. 29.

Before the different forms of receptacles here illustrated are specifically described, it is to be understood that the invention here involved is not limited to the structural details or arrangement of parts here shown since receptacles embodying the present invention may take various forms. It also is to be understood that the phraseology or terminology herein employed is for purposes of description and not of limitation since the scope of the present invention is denoted by the appended claims.

Figure 1:
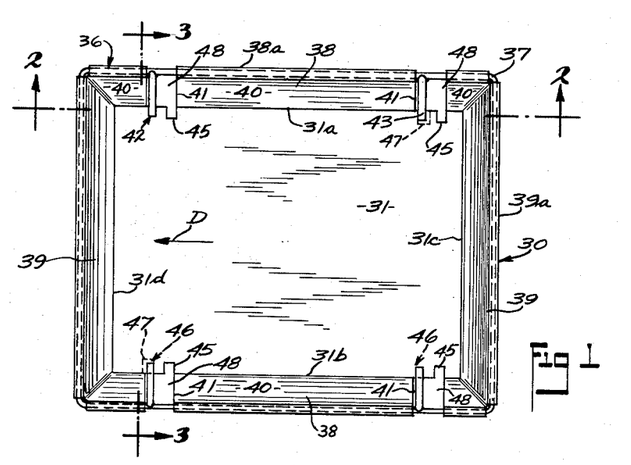
FIG. 1 is a top plan view of a first form of receptacle.
Figure 2:
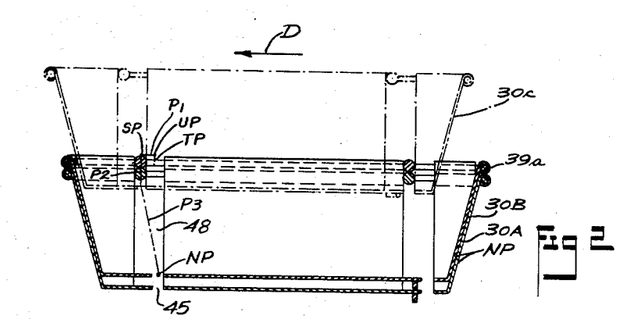
FIG. 2 is a vertical sectional view taken along the line 2—2 in FIG. 1 of a plurality of the receptacles shown in FIG. 1.
Figure 3:
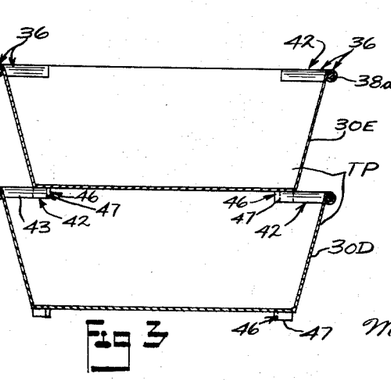
FIG. 3 is a vertical sectional view taken along the line 3—3 of FIG. 1 of two like receptacles in tiering position.

Receptacle 30 in FIGS. 1, 2 and 3 has rigidly connected together bottom portion 31 of generally rectangular shape with peripheral edges 31a, 31b, 31c and 31d; and four side walls 38 and 39 rigidly connected to bottom 31 along these edges. These side walls 38 and 39 have rolled bead upper edges 38a and 39a embracing a continuous wire frame 37. Each side wall 38 includes a planar portion or member 40 having two vertically extending slots 41 therein.

Two like receptacles 30 may be placed in tiering position TP in FIG. 3, as shown by these receptacles in positions 30D and 30E. Then, receptacle 30 in position 30D has four upper tiering support portions 42, each including a horizontal bar portion 43 welded at its outer end to wire frame 37, in engagement with four vertically aligned, corresponding, lower tiering support portions 46 on the bottom of the upper like receptacle in position 30E. These portions 46 include portions of the bottom surface of bottom 31 and two L-shaped members 47 secured to this surface to prevent substantial relative horizontal movement between the tiered receptacles in tiering position TP.

These two like receptacles 30 in tiering position TP in FIG. 3 may be moved from tiering position TP in FIG. 3 to nesting position NP in FIG. 2, as shown by the receptacles in positions 30A and 30B. This movement is most easily understood by considering the four recesses 45 in bottom 31 in FIG. 1 and realizing that the center of each of these recesses follows a similar parallel path in moving from position 30E through position 30C to position 30B with the path of one of these recesses 45 being shown in FIG. 2 and being shown schematically in FIG. 2A. During this movement, the receptacle in position 30E is raised slightly out of tiering position TP into an unshifted position UP in FIGS. 2 and 2A, shifted horizontally in horizontal linear direction D to shifted position SP wherein four recesses 45 in the upper receptacle are vertically aligned over the upper tiering support portions 42 of the lower like receptacle in position 30A, lowered vertically along path P2 so that these four recesses telescope down over the four upper tiering support portions 42 on the lower receptacle in position 30A, moved diagonally downwardly along path P3 through position 30C to position 30B into nesting position NP, shown by position 30A and 30B. Instead of moving the upper receptacle along path P3, it should be readily apparent that slots 41 are wide enough to permit the upper receptacle to move instead sequentially along horizontal path P4 and then along vertical path P5 to the same nesting position NP. This nesting action is possible because each of the four clearways 48 is located at each pair of vertically aligned tiering support portions 42 and 46; provide paths P2, P3, P4 and P5; and include one recess 45 in one of the opposite edges of bottom 31 and a slot 41 in a side wall.

Figure 4:
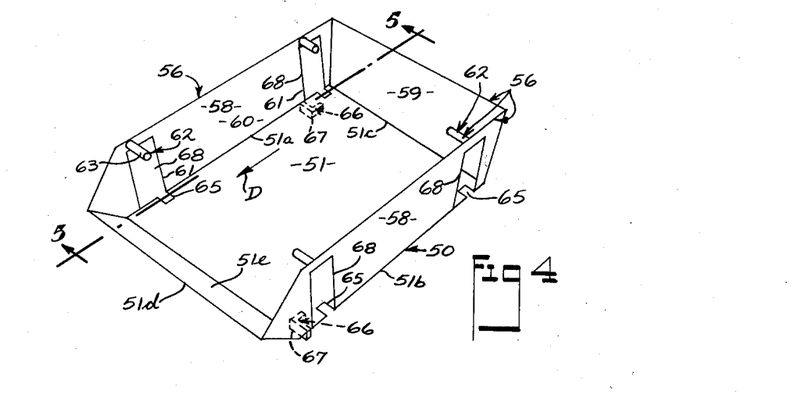
FIG. 4 is a perspective view of a second form of receptacle.
Figure 5:
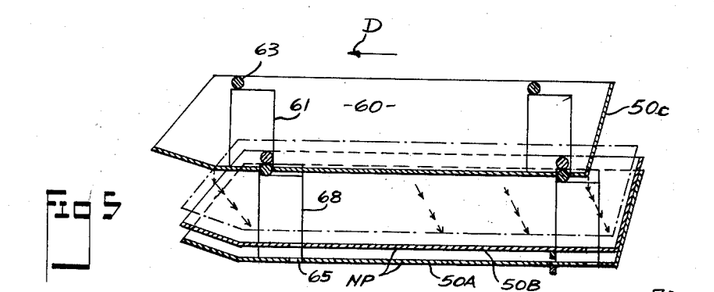
FIG. 5 is a vertical sectional view taken along the line 5—5 of FIG. 4 through a group of these receptacles from FIG. 4.
Figure 6:
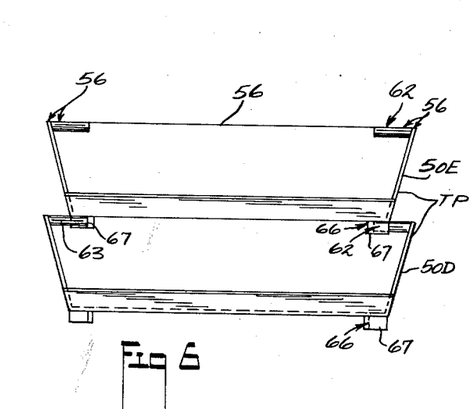
FIG. 6 is an end view of two receptacles from FIG. 4 in tiering position.

Receptacle 50 in FIGS. 4, 5 and 6 has rigidly connected together bottom portion 51 of generally rectangular shape with peripheral edges 51a, 51b, 51c and 51d with bottom portion 51 having a turned up portion 51e along side 51d; three side wall portions 58 and 59 rigidly connected to bottom 31 along these edges with each side wall having some of the upper edges 56 of the receptacle; four upper tiering support portions 62 with each including a horizontally extending bar portion 63; four lower tiering support portions 66 including portions of the bottom surface of bottom 31 and two L-shaped members 67 secured thereto; and four clearways 68, each including a slot 61 and including a recess 65 in the peripheral edge of bottom 31 along sides 51a and 51b. It should be readily apparent that like receptacles 50 can be manipulated in basically the same manner as receptacles 30 because similar motions are required to place them in the tiering position TP, as shown by the receptacles in positions 50D and 50E in FIG. 6, and to move them from tiering position TP to nesting position NP, as shown by the receptacles in positions 50A and 50B in FIG. 5. This movement from position TP to position NP requires a similar upward movement of the upper receptacle to position UP in FIG. 2A, a horizontal movement along path P1 in direction D to shifted position SP, and downward movements to lower the four recesses 65 down over the upper tiering support portions 62 in position 50A along path P2 through position 50C and then to lower into position 50B in nesting position NP along path P3.

Figure 7:
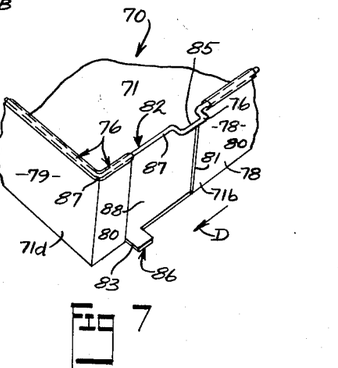
FIG. 7 is a perspective view of one corner of a third form of receptacle representing a slight structural modification of the receptacle shown in FIG. 1.

Only a corner of receptacle 70 is shown in FIG. 7, but it will be apparent that receptacle 70 generally resembles receptacle 30 in FIG. 1. Receptacle 70 has bottom 71, four upwardly and outwardly flaring side walls 78 and 79, four upper tiering support portions 82, four lower tiering support portions 86, four clearways 88 in positions similar to clearways 48 of FIG. 1, with one at each pair of coacting support portions and including a recess 85 and including a slot 81 in side wall plate member 80 of side wall 78, and the upper edges of the side wall portions rolled as a bead around a continuous wire frame 87 correspond respectively with the correspondingly named portions in receptacle 30. Frame 87 forms with the rolled edges of the side walls a continuous frame defining receptacle upper edges 76 in a plane generally parallel to bottom 71. Receptacles 30 and 70 are identical, except receptacle 70 differs from receptacle 30 by having recess 85, located along opposite receptacle sides (only side 78 along bottom edge 71b being shown), formed in frame 87 instead of in the edge of the bottom; having a portion of frame 87 forming the upper tiering support portions 82; and having a horizontally outwardly projecting lug or flat bar portion 86, coplanar and integral with bottom portion 71, forming each lower tiering support portion 86.

Like receptacles 70 may be placed in tiering position TP in generally the same manner as the receptacles 30 in FIG. 3. Then, the upper receptacle may be moved from a tiering position to a nesting position, similar to nesting position NP in FIG. 2, by now moving the four lower tiering support portions 86 on an upper receptacle 70 along the same paths P1, P2 and P3 to this nesting position, as previously described for recesses 45. Now, as the upper receptacle is moved from tiering position to position 50B in nesting position NP, these lower tiering support portions 86 travel down through recesses 85 in a lower receptacle in position 50A, as shown by position 50C, instead of having, as described for receptacle 30, recesses 45 following these paths down over upper tiering support portions 42.

Figure 2A:
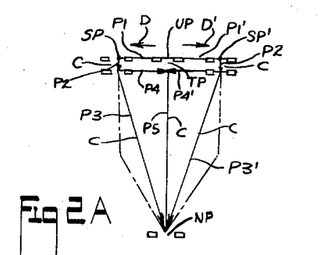
FIG. 2A is a schematic diagram of the paths of movement, as shown in FIG. 2, followed by corresponding portions on an upper receptacle nesting with a like lower receptacle in moving from tiering position to nesting position with respect to a like lower receptacle for each form of the receptacle disclosed herein in FIGS. 2, 5, 7, 9, 11, 13, 16, 19, and 22.

Receptacles 30, 50 and 70 may have their bottom and side portions formed of sheet metal or by suitable stamping. It should be noted that as to receptacles 30 and 50, the permissible amount of movement along path P1 in FIG. 2A is determined by the degree of taper of the side wall portions 39 and 79. Receptacle 50 has no such restriction applied to its movement in direction D along path P1 because this receptacle is open on the left side in FIG. 4. There, bottom 51 has a turned up portion 51e on the fourth side so that the receptacle might be used as a parts bin.

Figures 8, 9, 11:
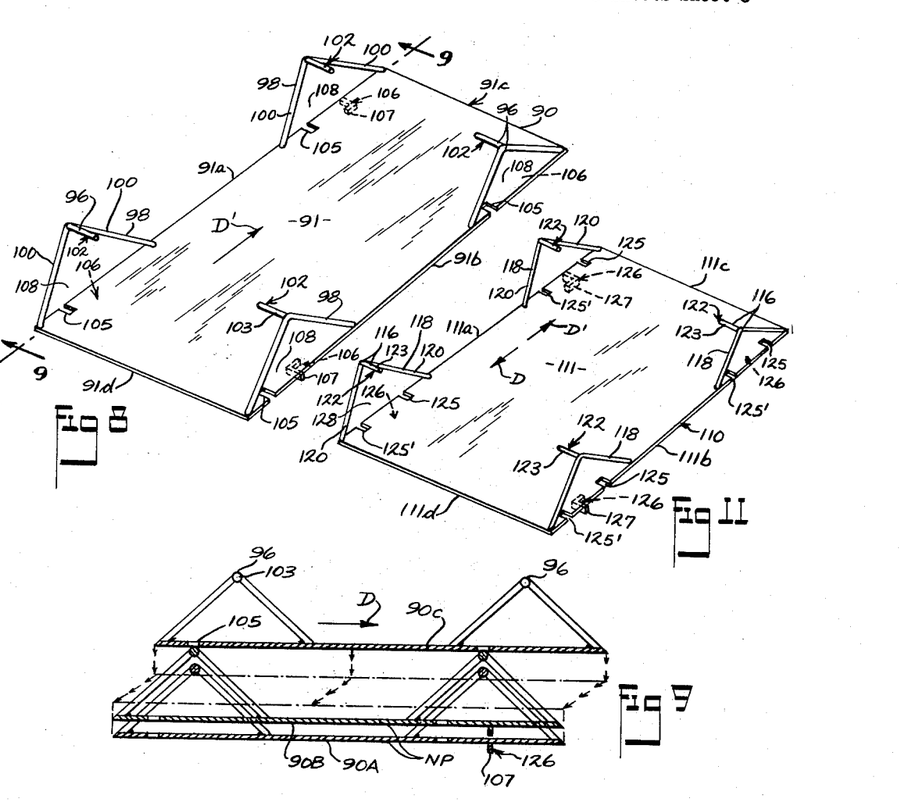
FIG. 8 is a perspective view of a fourth form of receptacle.
FIG. 9 is a vertical sectional view, taken along the line 9—9 in FIG. 8, of a plurality of the receptacles shown in FIG. 8.
FIG. 11 is a perspective view of a fifth form of receptacle.
Figure 9A:
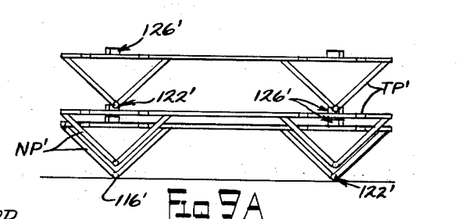
FIG. 9A is a side elevational view of a plurality of receptacles shown in FIG. 8 turned upside down.
Figure 10:
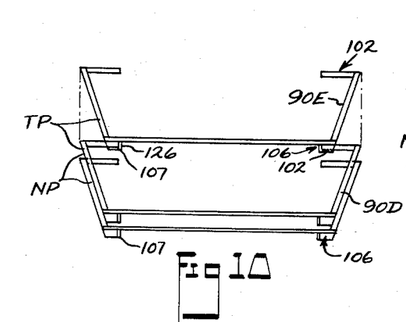
FIG. 10 is an end view of three receptacles shown in FIG. 8 with the bottom two in nesting position and the top two in tiering position.

Receptacle 90 in FIGS. 8, 9 and 10 has rigidly connected together bottom portion 91 of generally rectangular shape with peripheral edges 91a, 91b, 91c, and 91d; side portions 98 rigidly connected to bottom 91 along edges 91a and 91b; four upper tiering support portions 102; and four lower tiering support portions 106. These side portions 98 include, at each tiering support portion 102, a pair of upwardly converging side bars 100 having their upper ends connected together to form an inverted V-shape. Each upper tiering support portion 102 includes a horizontally extending bar portion 103 wherein upper edges of the receptacle 90 include the upper edge surfaces of these bar portions 103, include the vertices of these inverted V-shapes, and lie in a plane parallel to bottom portion 91. Lower tiering supports 106 include portions of the bottom surface of the bottom 91 and include two L-shaped members 107. Clearways 108 for upper tiering support portions 102 include a group of recesses 105 in the peripheral edges 91a and 91b of the bottom 91 equal in number and of the same spacing as the bar portions 103, but offset horizontally relative to bar portions 103. This bottom portion 91 has a generally rectangular peripheral edge 91a, 91b, 91c and 91d broken only by the aforesaid recesses.

Like receptacles 90 are placed in tiering position TP, as shown by position 90D and 90E in FIG. 10, in the same manner as receptacles 30 in FIG. 3. The upper receptacle 90 may be moved from its tiering position TP into nesting position NP in FIG. 9, as shown by the receptacles in positions 90A and 90B, by generally the same movements described for receptacles 30. However, the diagram of FIG. 2A should be compared with FIG. 9 as viewed from the side reverse to that shown. Then, if one looks at the opposite side of the receptacles in FIG. 9, the linear direction D and this movement in FIGS. 2A and 9 will be identical.

Receptacle 110 in FIG. 11 is identical to receptacle 90 in FIG. 8 except that it includes, in its four clearways 128, two groups of recesses shown as four recesses 125 and four recesses 125' instead of only the single group of recesses 105 in FIG. 8. Each of the groups consisting of recesses equal in number, four being shown here, and of the same spacing as horizontal bar portions 123 of the upper tiering support portions 122. The structure of receptable 110 is otherwise identical to receptacle 90. The bottom portion 111 being of generally rectangular shape with peripheral edges 111a, 111b, 111c, and 111d; side wall portions 118 with side bars 120; four upper tiering support portions 122 with horizontal bar portions 123; and four lower tiering support portions 126 with two L-shaped members 127 corresponding to the similarly named parts in receptacle 90.

Like receptacles 110 may be placed in tiering position TP in the same manner as the receptacles shown in positions 90D and 90E in FIG. 10. The upper receptacle may be moved from this position to the nesting position NP in FIG. 9 in direction D in the same manner as described for receptacle 90. However, since another group of recesses 125' is provided in receptacle 110, this movement may take place in the opposite direction D' in FIGS. 2A and 11 along a vertically symmetrical path taking the form of a raising movement of the upper receptacle 110 from the tiering position TP to the unshifted position UP, a horizontal movement along path P1' in FIG. 2A in direction D' to shifted position SP', a lowering movement along path P2' telescoping recesses 125' of the upper receptacle down over the bar portions 123 on the lower like receptacle, and a downwardly movement along path P3' to the same nesting position NP reached by using recesses 125 instead of recesses 125'.

Figure 12:
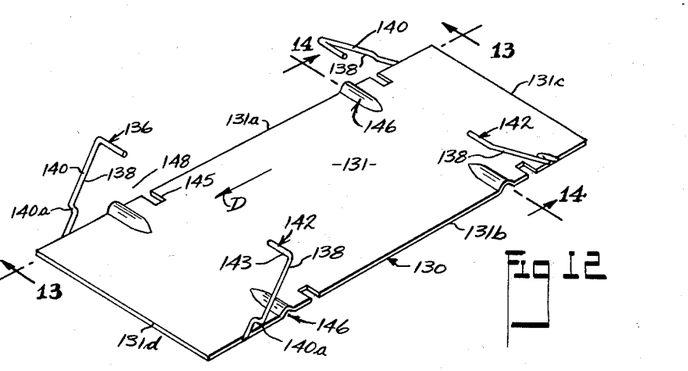
FIG. 12 is a perspective view of a sixth form of receptacle.
Figures 13, 13A:
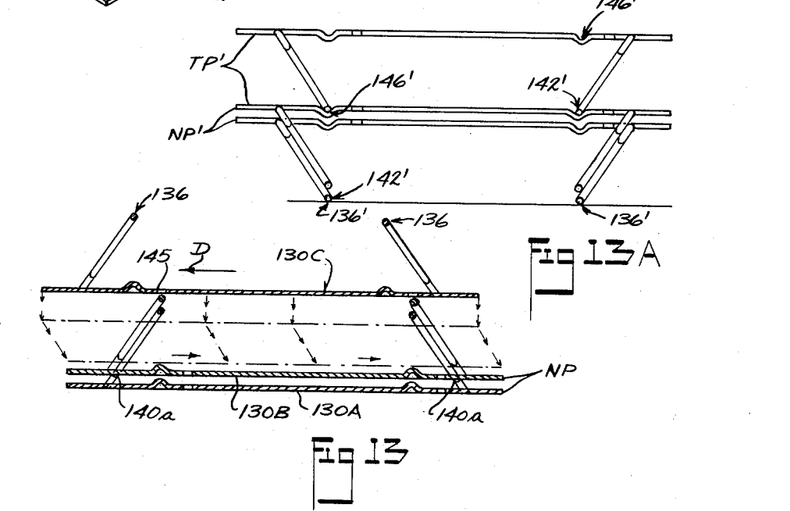
FIG. 13 is a vertical sectional view taken along the line 13—13 in FIG. 12 of a group of like receptacles.
FIG. 13A is a side elevational view of a plurality of receptacles shown in FIG. 12 turned upside down.
Figure 14:
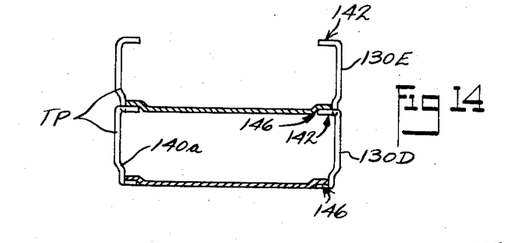
FIG. 14 is a vertical sectional view taken along the line 14—14 in FIG. 12 of two receptacles in tiering position.

Receptacle 130 in FIGS. 12, 13 and 14 has rigidly connected together bottom portion 131 of generally rectangular shape with peripheral edges 131a, 131b, 131c and 131d; opposite side wall portions 138 welded or otherwise rigidly connected to bottom 131 along edges 131a and 131b, and including upwardly converging side bar members 140; four upper tiering support portions 142 being formed by horizontal bar portions 143 integrally formed from a single bent wire with associated side bar 140; four lower tiering support portions 146 formed as depression grooves 146 stamped in the surface of bottom portion 131 on the side opposite tiering portion 142, here shown as the bottom surface; and four clearways 148 with one clearway for each upper tiering support portion 142 and including in bottom 131 a recess 145 offset horizontally relative to bar portions 143.

Like receptacles 130 are moved in the tiering position TP, as shown by the receptacles in positions 130D and 130E in FIG. 14, and the upper receptacle is moved to the nesting position NP in FIG. 13, as shown by positions 130A and 130B, in generally the same manner as earlier described for receptacle 30. The bends 140a in side bars 140 permit bottom 131 in position 130B to move downwardly far enough to reach this nesting position.

Figure 15:
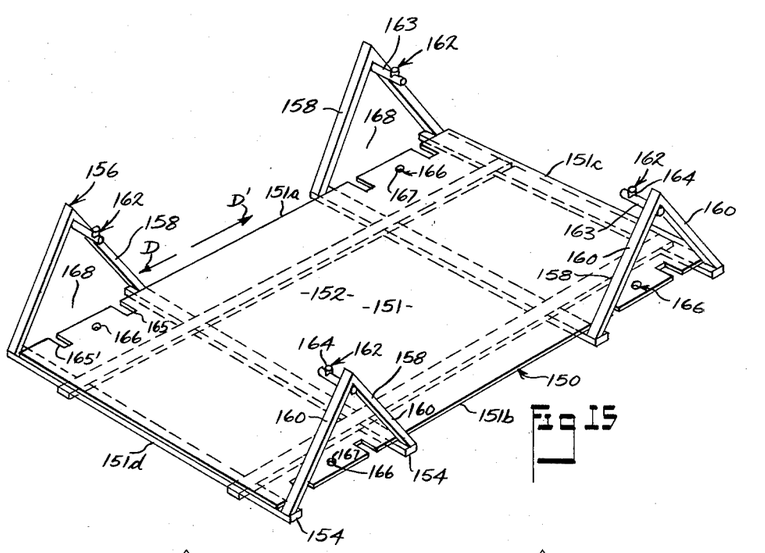
FIG. 15 is a perspective view of a seventh form of receptacle.
Figure 16:
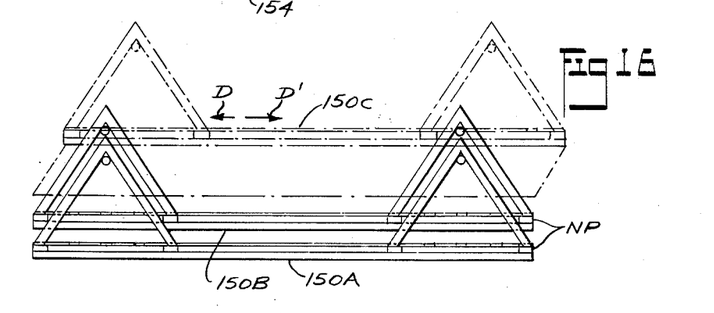
FIG. 16 is a side elevational view of a group of three receptacles from FIG. 15.
Figures 16A, 17:
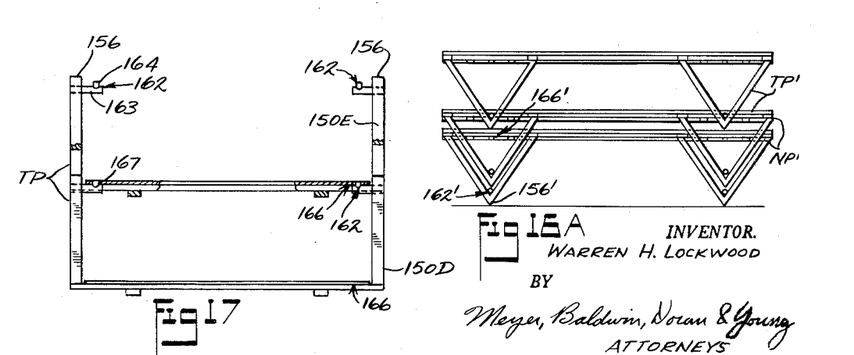
FIG. 16A is a side elevational view of a plurality of receptacles shown in FIG. 15 turned upside down.
FIG. 17 is an end view, partially in section, of two receptacles from FIG. 15 in tiering position.

Receptacle 150 in FIGS. 15, 16 and 17 has rigidly connected together bottom portion 151 of generally rectangular shape with peripheral edges 151a, 151b, 151c and 151d and with this bottom portion including a sheet or plate 152 made of any suitable material, such as plywood, which has secured to its bottom surface four parallel bars or strips 154; side wall portions 158 rigidly connected to bottom 151 along edges 151a and 151b; four upper tiering support portions 162; and four lower tiering support portions 166. Side wall portions 158 include, at each upper tiering support portion 162, a pair of upwardly converging side bars 160 having their upper ends connected together to form an inverted V-shape. Each upper tiering support portion 162 includes a horizontally extending bar portion 163, secured to bar 160, nesting in the crotch formed by the vertex angle of this aforesaid V-shape, and an upwardly directed portion 164 secured to portion 163 to complete the upper tiering support portion 162. The lower ends of side bars 160 are secured to the respective ends of bottom bars 154. Lower tiering support portions 166 include four eyelets or holes 167 in bottom 151 and include portions of the bottom surface of sheet 152 adjacent to these eyelets 167. There are provided four clearways 168 with one for each upper tiering support portion 162 and with each including two possible paths through recess 165 or 165'.

Like receptacles 150 are handled in basically the same manner as previously described for receptacle 110. The upper receptacle is moved vertically downwardly into tiering position TP, as shown by the receptacles in positions 150D and 150E in FIG. 17, so that four hook shaped upper tiering support portions 162 of a lower receptacle are received in the four eyelets 167 of the upper receptacle. The upper receptacle may be moved from tiering position TP to nesting position NP in FIG. 16, as shown by the receptacles in positions 150A and 150B, by the earlier described movement along paths P1, P2 and P3 or along paths P1', P2' and P3' in FIG. 2A.

Figure 18:
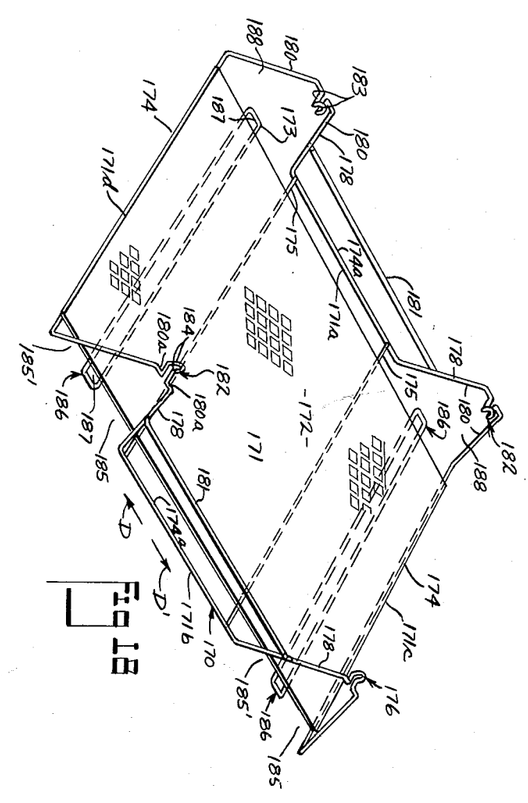
FIG. 18 is a perspective view of an eighth form of receptacle.
Figure 19:
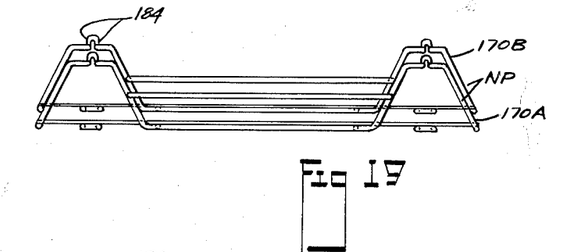
FIG. 19 is a side elevational view of two receptacles from FIG. 18 in nesting position.
Figure 20:
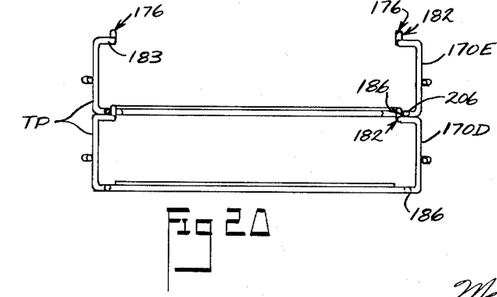
FIG. 20 is an end view of two receptacles from FIG. 18 in tiering position.

Receptacle 170 in FIGS. 18, 19 and 20 has rigidly connected together bottom portion 171 of generally rectangular shape with peripheral edges 171a, 171b, 171c and 171d; side wall portions 178 rigidly connected to bottom 171 along edges 171a and 171b; four upper tiering support portions 182; four lower tiering support portions 186; and for each upper tiering support portion, a clearway 188 having two recesses 185 and 185'. Bottom 171 includes a planar sheet 172 of expanded metal welded, or otherwise secured, on its bottom surface to two elongated loops 173 each projecting beyond opposite sides of sheet 172 and defining an eyelet 187 thereat to form with the outer end of loop 173 thereat one of the lower tiering support portions 186; parallel inner bars 175; and parallel end bars 174 forming edges 171c and 171d. Side wall portions 178 include two parallel side bars 181 welded or otherwise secured at opposite ends to side bars 180; bar portions 174a forming an intersecting edge of a side wall portion 178 and bottom 171; and at each upper tiering support portion 182, a pair of upwardly converging side bars 180 each having a horizontally extending portion 180a at its top edge. Each upper tiering support portion 182 includes two horizontally inwardly extending, parallel bar portions 183 having secured at their ends upwardly directed portions 184 joined by a bend to form an upwardly directed hook. It should be readily apparent that a single, bent wire may integrally form the aforedescribed portions 174, 174a, 180, 180a, 183, and 184.

Like receptacles 170 are placed in tiering position TP, as shown by the receptacles in positions 170D and 170E in FIG. 20, and the upper receptacle is moved to the nesting position NP, as shown by the receptacles in positions 170A and 170B in FIG. 19, in exactly the same manner as previously described for receptacle 150.

Figure 21:
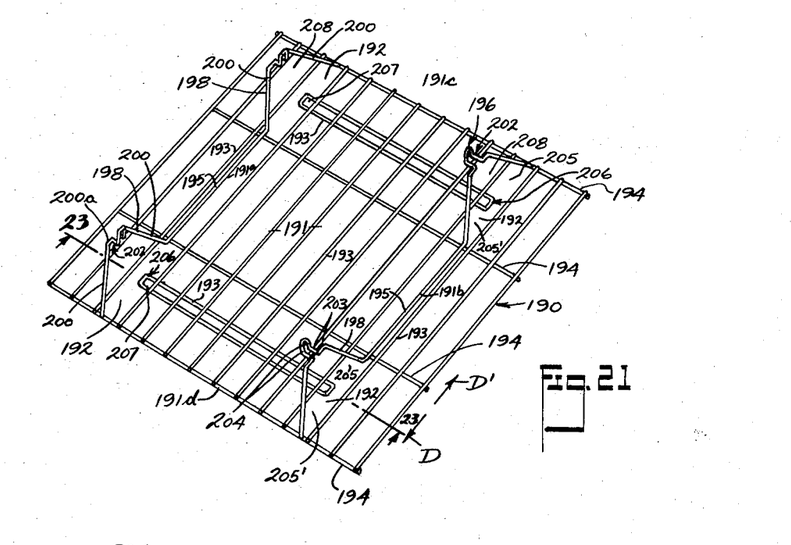
FIG. 21 is a perspective view of a ninth form of receptacle.
Figure 22:
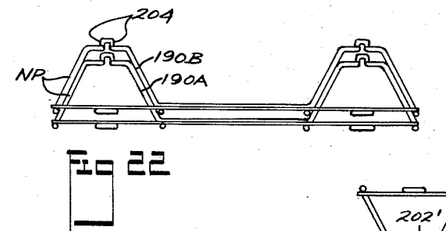
FIG. 22 is a side elevational view of two receptacles from FIG. 21 in nesting position.
Figure 22A:
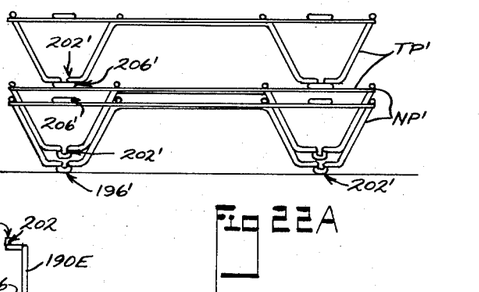
FIG. 22A is a side elevational view of a plurality of receptacles from FIG. 21 turned upside down.
Figure 23:
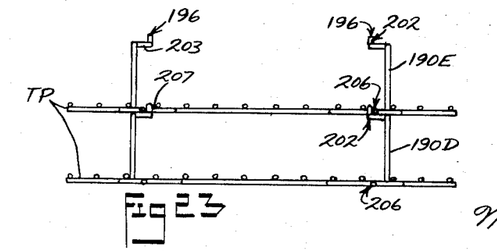
FIG. 23 is a vertical sectional view taken generally along line 23—23 located in the plane of the bottom portion in FIG. 21, and showing a plurality of the receptacles stacked to provide plural shelves.

Receptacle 190 in FIGS. 21, 22 and 23 has rigidly connected together bottom portion 191 of rectangular outline having mutually parallel sides therewith and inwardly therefrom another generally rectangular shape with peripheral edges 191a, 191b, 191c and 191d; side wall portions 198 rigidly connected to bottom 191 along edges 191a and 191b; four upper tiering support portions 202; and four lower tiering support portions 206; and four clearways 208 with one for each upper tiering support portion and with each including two recesses 205 and 205'. Bottom 191 includes a planar structure 192 having a plurality of parallel bars 193 and parallel bars 194 arranged crosswise and welded together to provide in FIG. 21 a horizontal dimension, extending generally perpendicular to linear direction D, greater than the span of the outside of the side wall portions 198. Bottom 191 also has welded to the lower surface of bars 193 two elongated loops 193 forming eyelets 207 at opposite ends. Each eyelet 207 forms with the outer end of its loop 193 one of the lower tiering support portions 206. Side wall portions 198 include at each tiering support a pair of upwardly converging bars 200 and horizontal bar portions 200a, and include in common with bottom 191 parallel bars 195 forming a common edge 191a or 191b therebetween. Each upper tiering support portion 202 has a pair of horizontal bar portions 203 with upwardly directed parallel portions 204 at their outer ends joined at their upper ends by a bend to form a hook shape adapted to coact with one of the eyelets 207 in a like receptacle 190 in tiering position TP. It should be readily apparent that along each edge 191a or 191b, a single bent wire may form the aforesaid portions 195, 200, 200a, 203, and 204.

Like receptacles 190 are moved into the tiering position TP, as shown by the receptacles in positions 190D and 190E in FIG. 23, and are moved from this tiering position TP into the nesting position NP, as shown by the receptacles in positions 190A and 190B in FIG. 22, in generally the same manner as the receptacles 170 are manipulated. The movement to nesting position NP is possible because parallel slots 192 in bottom 191 of one receptacle (the upper receptacle) and the parallel, spaced apart, side wall portions 198 of another receptacle (the lower receptacle) are dimensioned so that they telescope as the upper receptacle moves down into the nesting position NP during movement along paths P2 and P3 in FIG. 2A or along paths P2' and P3'.

FIGS. 24–30 illustrate receptacles wherein the left end of the receptacle has one pair of upper tiering support portions, lower tiering support portions, and clearways of different structural relationship than the corresponding parts on the right end of the receptacle. However, it should be readily apparent that any two like receptacles of any of these three designs will tier, nest, and move between tiering and nesting positions in generally the same manner in direction D, as illustrated in FIG. 2A and heretofore described for the other receptacles.

Figures 24, 25, 26, 27, 28:
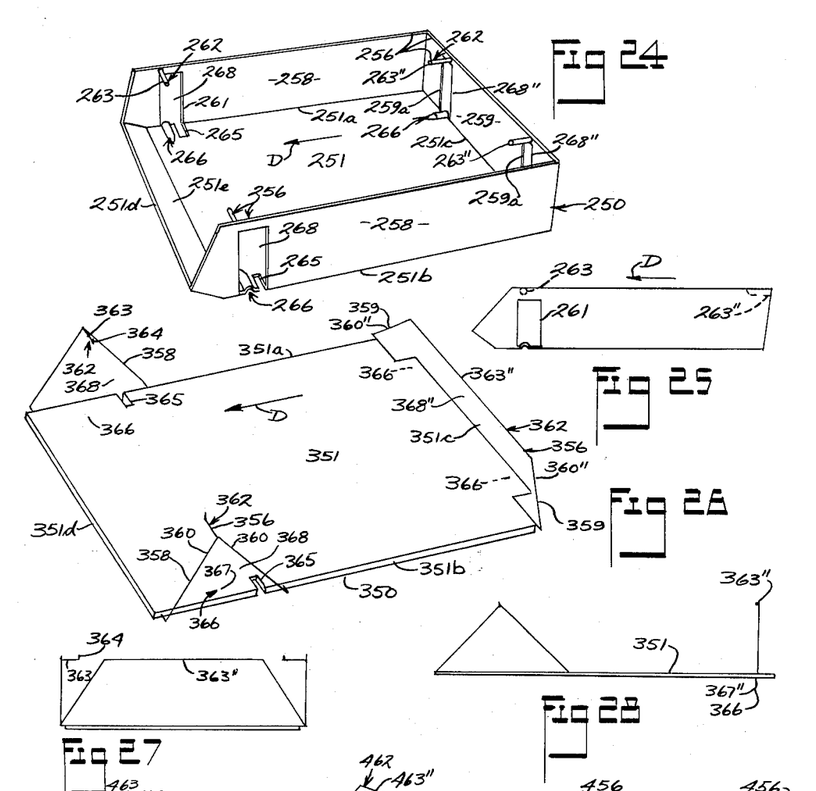
FIG. 24 is a perspective view of a tenth form of receptacle being a modification of the second form of receptacle in FIG. 4.
FIG. 25 is a side elevational view of the receptacle in FIG. 24.
FIG. 26 is a perspective view of an eleventh form of receptacle with this view being a schematic showing and modification of the structure of the form of receptacle in FIG. 15.
FIG. 27 is an end view of the receptacle in FIG. 26.
FIG. 28 is a side elevational view of the receptacle in FIG. 26.

Receptacle 250 in FIGS. 24 and 25 (resembling receptacle 50 in FIG. 4) has rigidly connected together bottom portion 251 of generally rectangular shape with peripheral edges 251a, 251b, 251c and 251d with bottom portion 251 having a turned up portion 251e along side 251d; three side wall portions 258 and 259 rigidly connected to bottom 251 along these edges with each side wall having some of the upper edges 256 of the receptacle; four upper tiering support portions 262 with each including a horizontally extending bar portion 263 or 263''; and four lower tiering support portions 266. To permit movement of an upper like tray from tiering to nesting position past bars 263 and 263'' on a lower tray, tray 250 is provided at its left end with two clearways 268, each including slot 261 and recess 265; and on its right end with two clearways 268'', each including slot 259a in wall 259. The trays in FIGS. 4 and 24 differ in that all of the upper tiering support bars 63 are parallel in FIG. 4, while in FIG. 24 two parallel bar portions 263'' extend parallel to bottom 251 and opposite side wall portions 258.

Receptacle 350 or 450 in FIGS. 26–30 has respectively rigidly connected together bottom portion 351 or 451 of generally rectangular shape with peripheral edges in the form of a plate; side wall portions 358, 359 or 458, 459 rigidly connected to bottom 351 or 451 along its edges; four upper tiering support portions 362 or 462; and four lower tiering support portions 366 or 466. Side wall portions 358, 359, 458 or 459 include, at each upper tiering support portion 362 or 462, a pair of upwardly converging side bars 360, 360'', 460 or 460'' having their upper ends connected together to form a V or by bar portion 363'' or 463''. Each upper tiering support portion 362 or 462 includes at the left end of the tray a horizontally extending bar portion 363 or 463, secured to and nesting in the crotch formed by the vertex angle of the V-shape formed by bars 360 or 460, and an upwardly directed portion 364 or 464 secured to portion 363 or 463 to complete the upper tiering support portion 362 or 462. The lower ends of side bars 360, 360'', 460 or 460'' are secured to the respective edges of bottom 351 or 451 by suitable bends. Lower tiering support portions 366 or 466 at the left end include two eyelets or holes 367 or 467 in bottom 351 or 451 and portions of this bottom adjacent to these eyelets. There are provided at the left end of each tray two clearways 368 or 468 with one for each bar 363 or 463 and with each including a path through recess 365 or 465. There are provided at right end of each tray clearways 368'' or 468'' with one for each bar 363'' or 463''. Two bars 463'' each extend diagonally across one of the two right-hand corners of the tray and extend parallel to bottom 451. Bar 363'' extends parallel to portion 351, perpendicular to side wall portions 358, and has its opposite ends rigidly connected with opposite sides 351a and 351b by bar portions 360''. The lower tiering support portions in the right-hand end of the trays in FIGS. 28 and 30 takes the form of a surface portion 367'' or 467'' on the bottom surface of bottom 351 or 451.

The receptacles described heretofore have many generic structural features and many structural features common to some but not all of the receptacles. The following paragraphs will describe first the generic features and then later these common features.

The aforedescribed receptacles have many generic features. Receptacle 30, 50, 70, 90, 110, 130, 150, 170, 190, 250, 350 or 450 respectively is adapted for tiering in tiering position TP and nesting in nesting position NP with other like receptacles; has a bottom portion or load supporting portion 31, 51, 71, 91, 111, 131, 151, 171, 191, 251, 351 or 451 generally defining a rectangle in outline with side or edges 31a, 31b, 31c and 31d; 51a, 51b, 51c and 51d; 71b, 71d, and the other two edges corresponding to edges 31a and 31c; 91a, 91b, 91c and 91d; 111a, 111b, 111c and 111d; 131a, 131b, 131c and 131d; 151a, 151b, 151c and 151d; 171a, 171b, 171c and 171d; 191a, 191b, 191c and 191d; 251a, 251b, 251c and 251d; 351a, 351b, 351c and 351d; or 451a, 451b, 451c and 451d as edges of a rectangle (in FIG. 21, this rectangle is formed within the area of bottom portion 191 and bounded by side wall portions 198); means defining upper edges 36, 56, 76, 96, 116, 136, 156, 176, 196, 256, 356 or 456 lying generally in a plane parallel to and spaced vertically relative to or above this bottom portion; and side wall portions 38 and 39, 58 and 59, 78 and 79, 98, 118, 138, 158, 178, 198, 258 and 259, 358 and 359, or 458 and 459 rigidly connecting this bottom portion and upper edges. Side wall portions 38, 58, 78, 98, 118, 138, 158, 178, 198, 258, 358 or 458 extend generally in linear direction D and are located along two opposite, generally parallel sides or edges 31a and 31b, 51a and 51b, 71b and the edge corresponding to edge 31a, 91a and 91b, 111a and 111b, 131a and 131b, 151a and 151b, 171a and 171b, 191a and 191b, 251a and 251b, 351a and 351b, or 451a and 451b of this rectangle contiguous to the clearways 48, 68, 88, 108, 128, 148, 168, 188, 208, 268, 368 or 468. Each receptacle includes a first plurality of tiering support portions, here shown as upper tiering support portions 42, 62, 82, 102, 122, 142, 162, 182, 202, 262, 362, or 462 with four being shown here on each receptacle, rigid with these upper edges; and a second plurality of tiering support portions, here shown as lower tiering support portions 46, 66, 86, 106, 126, 146, 166, 186, 206, 266, 366 or 466 rigid with the bottom portion with each tiering support portion in one of these pluralities including a horizontal bar portion 43, 63, 83, 103, 143, 163, 183, 203, 263, 363 or 463 extending laterally from the plane of its contiguous side wall portion generally perpendicular to linear direction D and having a free distal end or including other bar portions 263″, 363″ or 463″. Each receptacle having one of the four upper tiering support portions and one of the four lower tiering support portions contiguous to each corner of the rectangle on its bottom portion. Although substantially solid side wall portions are shown in only FIGS. 1–7, it should be readily apparent that the side wall portions in FIGS. 8–23 may be made of stronger construction and made more solid, and a large frame may be placed around the top and outside for additional strength, without interfering with manipulation of the receptacles between position TP and NP. Also, it should be noted that each receptacle may be made of any suitable material, such as wire, wood, sheet metal, etc. without interfering with its mode of operation. Also, note that each receptacle has rigidly connected component parts or portions and has no relatively movable parts.

In a generic sense, two like receptacles, of each of the receptacle forms disclosed, may be placed vertically aligned in a tiering position TP for supporting articles on spaced apart bottom portions, and the upper like receptacle may be moved to a nesting position NP, with the receptacles vertically aligned, by a horizontal shifting or shuffle movement and a vertical downward movement while the bottom portion remains horizontal so as not to spill any articles carried thereby. This movement from tiering position TP to nesting position NP is possible because the dimensions of the upper and lower parts of the receptacle permit the lower part of an upper like receptacle to enter vertically downwardly into the upper part of a lower like receptacle. In each form of receptacle disclosed, the upper receptacle is movable from tiering to nesting position because the dimensions of the receptacle permit: (1) a shifting movement along path P1 or P1′ in FIG. 2A in a linear direction D or D′ of the upper like receptacle relative to the lower like receptacle by moving the bottom portion of the upper receptacle generally horizontally from unshifted position UP to shifted position SP or SP′; and (2) the lower part of the upper like receptacle to enter vertically downwardly into the upper part of the lower like receptacle along paths P2 and P3; P2, P4 and P5; P2′ and P3′; P2′, P4′ and P5′ or an equivalent path.

In each form of receptacle illustrated, each of its upper tiering support portions, lower tiering support portions and clearway recesses are spaced apart corresponding horizontal distances to permit a rigid alignment of the receptacles in tiering position TP and to permit the aforedescribed movement between tiering position TP and nesting position NP.

Each tiering position TP has generic features. In unshifted position UP, the lower tiering support portions 46, 66, 86, 106, 146, 166, 186, 206, 266, 366 or 466 of an upper receptacle are positioned to rest vertically down upon the upper tiering support portions 42, 62, 82, 102, 142, 162, 182, 202, 262, 362 or 462 of a lower like receptacle in tiering position TP with the perimeter of the upper receptacle substantially vertically aligned above the lower receptacle because the lower tiering support portions are spaced substantially vertically relative to the upper tiering support portions on each receptacle, and are shown here as vertically beneath said upper portions. In each tiering position TP, the dimensions of the receptacles permit the side wall portions of the upper and lower receptacles to be spaced apart in non-contacting position and permit any permissible relative horizontal movement between these upper and lower receptacles in tiering position to occur without abutting contact of the side wall portions of the receptacles because at least one of the plurality of tiering support portions 42, 62, 86, 102, 122, 142, 162, 182, 202, 262, 362 or 462, engageable with the other receptacle, is laterally spaced from the side wall portions.

In shifted position SP or SP′ in FIG. 2A, there being a clearway 48, 68, 88, 108, 128, 148, 168, 188, 208, 268 or 268″, 368 or 368″, or 468 or 468″ in each lower receptacle from the level of each of the upper tiering support portions down to the nesting level or nesting position NP in the lower receptacle occupied by the lower tiering support portion of an upper like receptacle. These clearways include respectively recesses 45; 65; 85; 105; 125 and 125′; 145; 165 and 165′; 185 and 185′; 205 and 205′; 265; 365; or 465 located contiguous to a side wall edge portion (recess 85 is located contiguous to the upper edge and the other recesses are located contiguous to the lower edge portion) through which bar portions 43, 63, 83, 103, 123, 143, 163, 183, 203, 263, 363 or 463 travel during upper receptacle movement between tiering and nesting positions. In each receptacle, each bar portion is out of vertical alignment with its recess corresponding to the recess on a like receptacle through which it travels in this manner. In each receptacle, the two, opposite, parallel side wall portions 38, 58, 78, 98, 118, 138, 158, 178, 198, 258, 358, or 458 can be of any suitable construction to permit this movement into nesting position NP and need not have all their portions extending parallel to the path of nesting movements. For example, those two side portions have at least some edge portions (edge portions of slots 41, 61, 81, or 261; or edges of members 100, 120, 140, 160, 180, 200, 360 or 460) connecting the bottom portion and upper edges and extending non-parallel to the shortest movement path P3 or P3′ in FIG. 2A. Also, a group of nested receptacles will remain vertically aligned in a stack with bars 43, 63, 83, 103, 143, 163, 183, 203, 263, or 263″, 363 or 363″, or 463 or 463″ vertically aligned but will still nest because each of the clearways has a clearway portion, along path P5 in FIG. 2A, of at least the width of one of the tiering support portions 42, 62, 86, 102, 122, 142, 162, 182, 202, 262, 362, or 462 as measured along linear direction D and extending vertically along path P5 in FIG. 2A, from immediately beneath its associated upper tiering support portion down to immediately above its associated lower tiering support portion.

As the group of nested receptacles increase in number, it should be noted that an upper like receptacle added thereto will have to be moved along one of the dot-dash line paths in FIG. 2, instead of along path P3 or P3′, so as to move in the stacked group past these vertically aligned bars 43, 63, 103, 143, 163, 183, 203, 263, or 263″, 363 or 363″, or 463 or 463″ in FIGS. 1–6 and 8–30 and recesses 76 in FIG. 7. The substantial width of each clearway in the linear direction D permits nesting a substantial number of receptacles in the group without interference and also permits random movement from path P2 or P2′ in FIG. 2A to nesting position NP along any one of the many paths shown in FIG. 2A.

It should now be readily apparent that some of the aforedescribed receptacles have other uses. As mentioned earlier, the words "receptacle" and "tray" are intended to cover flats and similar article carrying devices wherein the articles are carried on the aforedescribed bottom portions. For example, when several receptacles (for example, ten receptacles) are placed in tiering position to form a tiered group, flats or article carrying surfaces 191 in FIGS. 21–23 may serve in this tiering position TP as a room divider, bookcase, spaced apart knock-down shelving, or commercial display.

As shown in FIGS. 9A, 13A, 16A or 22A, if desired, any of these whole tiered groups might be turned upside down to rest on the floor by the heretofore called upper tiering support portions of the receptacle now lowest in the group to provide the same uses. These illustrated groups could serve as knock-down shelving, which could be shipped nested in nesting position NP' and then set up at place of use in tiering position TP'. The corresponding tiering support portions, edges, nesting position and tiering position have the same reference numerals in the upside down position, as used in the right side up tiering positions TP, but respectively have prime suffixes, such as 202', 206', 196', NP' and TP' in FIG. 22A.

Each form of tray or receptacle illustrated in FIGS. 1–30 either may be used right side up (as shown in FIGS. 2, 5, 7, 9, 11, 13, 16, 19, 22, 24, 26 or 29) in nesting position NP or tiering position TP or may be used upside down, as shown by example in FIGS. 9A, 13A, 16A or 22A, in nesting position NP' or tiering position TP'. When used upside down, these tiered trays in tiering position TP' provide knock-down shelving, which could be shipped nesting in nesting position NP' and then tiered or set up at place of use in tiering position TP'; or these trays provide a series of pallets.

Generic features are found in both the right side up and upside down uses illustrated. A first plurality of tiering support portions 42, 62, 82, 102, 122, 122', 142, 142', 162, 162', 182, 202, 202', 262, 362 or 462 are provided rigid with the edges of the tray, spaced vertically relative to the load supporting portion, whether these edges be shown as upper edges 36, 56, 76, 96, 116, 136, 156, 176, 196, 256, 356 or 456 or as lower edges 116', 136', 156' or 196'. A second plurality of tiering support portions 46, 66, 86, 106, 126, 126', 146, 146', 166, 166', 186, 206, 206', 266, 366 or 466 is formed rigid with the load supporting portion, such as bottom portion 91. When each form of tray is moved from tiering to nesting position, it follows generally the same path of movement as shown in FIG. 2A. In shifted position SP or SP', there is provided a clearway from the level of each of the tiering support portions of the aforementioned first plurality to that nesting level occupied by the aforementioned second plurality of tiering support portions of a like tray when two like trays are in nesting position. The dimensions of the upper and lower parts of the tray permit the lower part of an upper tray to move vertically downwardly to telescope with respect to the upper part of a lower like tray to reach the nesting position.

To provide vertical alignment in tiering position, the tiering support portions in the aforementioned first plurality of tiering support portions are spaced substantially vertically relative to the tiering support portions in the second plurality.

In the right side up illustrations, the aforementioned first plurality are upper tiering support portions and the second plurality are lower tiering support portions with these portions being shown, for example, respectively in FIG. 15 as portions 162 and 166.

In the upside down illustrations, the aforementioned first plurality are lower tiering support portions and the second plurality are upper tiering support portions with these portions being shown, for example, respectively in FIG. 16A as portions 162' and 166'. Now, the lower tiering support portions are rigid with the lower edges and the upper tiering support portions are rigid with the load supporting portion of each tray. In upside down use, when the upper tray is moved from tiering position TP' to nesting position NP', there is a clearway provided in the upper tray between the load supporting portion and lower edges and side portions upwardly from each of these lower tiering support portions. This clearway is enterable over the corresponding upper tiering support portions of the lower like tray in like orientation only by manipulation, such as the aforedescribed horizontal movement from position UP to SP in FIG. 2A, after which the upper tray may pass downwardly with respect to these last mentioned upper tiering support portions to nesting position NP' with respect to the lower tray.

In right side up position, the large distance between the tops of opposite side walls of each receptacle provides an open top for easier loading and nesting. The distance between corresponding upper portions of the side wall portions 38, 58, 78, 98, 118, 138, 158, 178, 198, 258, 358 or 458 in the plane of the upper support portions, is at least as great as a parallel distance between corresponding lower portions of the same side wall portions in the plane of the lower support portions. These side wall portions do not converge upwardly, but are either generally parallel, as shown by side wall portions 138, 158, 178, 198, 358 or 458, or diverge upwardly from their bottom portion, as shown by side wall portions 38, 58, 78, 98, 118 or 258.

In addition to this arrangement of these opposite side wall portions, there are other structural features common to some receptacle forms but not found in others so to be sub-generic, and will be described hereinafter. Although the comments hereinafter apply equally well to upside down and right side up tray use, the comments hereafter will be generally restricted to right side up usage.

Proper nesting may be obtained independently of the relative horizontal dimensions of the bottom and top in right side up position, and the dimensions of the bottom need not be smaller than corresponding dimensions of the top. In all receptacles, except receptacle 30, at least one horizontal dimension across the bottom of the receptacle is at least as great as the corresponding dimension across the top of the receptacle in the plane of the upper edges. This horizontal dimension may be measured in generally the linear direction D in the receptacle forms shown in FIGS. 4–9, 10–13, 14–16, 17–22, 23, and 24–30; and may also be measured perpendicular to this linear direction D in the receptacle forms in FIGS. 21, 22 and 23.

In FIGS. 8, 9, 10, 11, 15, 16, 17–22, 23, and 26–30, the side wall portions have common features. These side wall portions in right side up position include, at each of at least some upper tiering support portions, a pair of two converging bars 100, 120, 160, 180, 200, 360 or 460 with these bars upwardly converging in FIGS. 8, 11, 15, 18, 21, 26 and 29 and downwardly converging in FIGS. 9A, 16A and 22A; having their diverging ends (lower ends in FIG. 15) rigid with their associated bottom portion; and having their converging ends (upper ends in FIG. 15) rigid with and generally straddling their associated upper tiering support portion. In FIGS. 8–11, 15–17, and 26–30, each pair of converging side bars have their upper ends connected together to form a V-shape, here shown as an inverted V-shape in FIG. 8, for example.

In tiering position TP, at least a portion of the opposite ends of the receptacles in FIGS. 8, 9, 10–13, 14–16, 17–22, 23, and 29 are open above the bottom portion in tiering position for convenient loading of these tiered receptacles. At least a portion of two opposite bottom edges form receptacle defining top edges 91c and 91d, 111c and 111d, 131c and 131d, 151c and 151d, 171c and 171d, 191c and 191d, or 451c and 451d of the receptacle. In tiering position TP, these edges are located substantially below the plane of the upper edges of the receptacle, and below the bottom of any tiered receptacle thereabove, to provide a space between tiered bottom portions for loading articles thereon over either of these two edges.

In each of the receptacles in FIGS. 12, 13, 14–16, 17–22, and 23, all of the upper tiering support portions, all of the lower tiering support portions, and all of the clearway recesses are identical in shape and bear the same structural relationship. The same identity in shape is true of all of the upper tiering support portions and all of the clearway recesses in FIGS. 1–9, 10 and 11, and of all of the lower tiering support portions in FIG. 7. Although this identical construction has been stressed and illustrated in each receptacle, it should be readily apparent that a tray having recesses or tiering support portions from different illustrated forms may be combined in a single tray, which will tier and nest with like trays in the same manner. For example, a combined tray might be formed with two upper tiering support portions and two lower tiering support portions at the left in FIG. 15 combined with corresponding portions at the right in FIG. 11.

The upper tiering support portions in right side up condition may take various shapes. At least some of these upper tiering support portions are inwardly or laterally directed from their rigidly connected side portions in FIGS. 1–6, 8, 9, 10–13, 14–16, 17–22, 23, and 24–30 and include inwardly directed coplanar and coaxial or parallel horizontal bar portions 43, 63, 103, 123, 143, 163, 183, 203, 263, 363, or 463. These bar portions are arranged in pairs of two with each of these two rigid with a different one of the opposite side wall portions but with these two contiguous to adjacent corners, such as bar portions 363 in FIG. 26 so associated with the left-hand corners of tray 350. In FIGS. 15, 16, 17–22, 23, and 26–30 these upper tiering support portions are upwardly opening hooks, formed in hook shape by the aforesaid inwardly directed bar portions connected to upwardly directed portions 164, 184, 204, 364 or 464 spaced laterally inwardly from the side wall portions and forming with their distal upper ends the ends of the hooks.

Figures 29, 30:
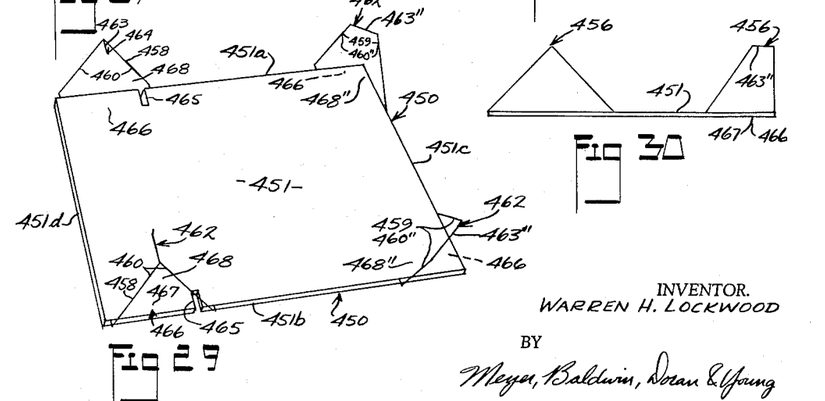

However, the upper and lower tiering support portions and the clearways in the right-hand two corners of the trays in FIGS. 24, 26 and 29 are of different structural relationship than those in the left-hand two corners. Since the tray movement in each of these forms from tiering to nest position takes place in direction D along paths P1, P2 and P3, the right-hand side of the upper tray is moved to the left out of interference with the upper tiering support portions of the lower tray so that it may slip thereunder downwardly through clearway 268″, 368″ or 468″ to the nesting position generally in the same manner as described for the trays in FIGS. 4, 11 and 15.

The illustrated lower tiering support portions in right side up condition include various structures. In each form of receptacle illustrated in right side up position, these portions include the bottom surface of the bottom portion for vertically spacing apart the receptacle in the tiering position TP. In FIGS. 1–6, 8, 9, 10 and 11 these portions include two L-shaped members 47, 67, 107 or 127 rigid with the bottom surfaces of their associated bottom portions. In FIGS. 12 and 24, these portions include depression grooves 146 or 266 stamped in the bottom surface of said bottom portion. In FIGS. 15, 16, 17–22, 23, and 26–30, at least some of these lower tiering support portions include eyelets 167, 187, 207, 367 or 467 rigid with their associated bottom portion. In these receptacles, the dimensions of the receptacle permit the aforedescribed upwardly directed portions of the hooks of a lower receptacle to engage in the eyelets of an upper receptacle (or the bars in the grooves) in tiering position to prevent horizontal relative movement of the tiered receptacles. Since the eyelets or bars are coplanar in one plane and the hooks or grooves are coplanar in another plane parallel to this one plane, the bottom portions will be parallel in tiering position TP.

In FIGS. 1–6, 8, 9, 10–13, 14–16, 17–22, 23, and 24–30, the aforedescribed upper and lower tiering support portions, coacting on adjacent tiered receptacles in right side up condition, prevent substantial relative movement in opposite horizontal directions along linear direction D, and perpendicular thereto, so that the tiered receptacles will maintain their vertical alignment with no tendency of the tiered group to topple. These aforedescribed hooks, eyelets, inwardly directed horizontal bar portions, and L-shaped members each provide substantially identically constructed limit stops rigid with at least some portions of the receptacle and spaced apart in a plane within ends of the side wall portions so as to minimize the overall horizontal dimensions of the receptacles in FIGS. 1–6, 8, 9, 10–13, 14–16, 17–22, 23, and 24–30.

The common structure of the receptacles in FIGS. 1–6, 8, 9, 10–13, 14–16, 17–22, 23, and 24–30 permits the aforedescribed movement between the tiering position TP and nesting position NP. In these receptacles, at least some of the upper tiering support portions (all such portions in FIGS. 1–23 and at least the two on the left-hand end of the tray in FIGS. 24–30) are inwardly directed from the opposite side wall portions to be located inwardly from a plane formed by these associated side wall portions. Each of these receptacles has clearways including at least one group of recesses or notches equal in number (shown as four in number at 45, 65, 105, 125, 125′, 145, 165, 165′, 185, 185′, 205, or 205′ or shown as two in number at 265, 365 or 465) to the corresponding upper tiering support portions; correspondingly located equal distance from the associated lower tiering support portions; dimensioned for permitting one group of recesses in an upper receptacle to telescope over the upper tiering support portions on a lower receptacle during movement of the upper receptacle between tiering position TP and nesting position NP.

In FIGS. 11, 15, 16, 17–22, and 23, each receptacle has clearways including two of these groups of recesses similarly dimensioned and permitting movement of the upper receptacle in generally the same manner, but by movement in opposite horizontal directions, from tiering position TP to nesting position NP. All of the recesses 125, 165, 185, or 205 in one group are located on corresponding one sides and all recesses 125′, 165′, 185′ or 205′ in the other group are located on the corresponding opposite sides of the corresponding lower tiering support portions. In these constructions, the dimensions of the receptacle and these two groups of recesses provide two different shifted positions SP and SP′ in FIG. 2A on generally horizontally opposite sides of the unshifted position UP so as to provide clearways along paths P3 and P3′, or along another pair of symmetrically illustrated paths in FIG. 2A, from these shifted positions to common nesting position NP. Hence, the horizontal shifting movement from unshifted position UP is permitted in either of the two horizontal opposite directions D or D′ in FIG. 2A to shifted position SP or SP′ along a linear direction, and then the upper receptacle is movable through one of the groups of clearway recesses from either shifted position through the clearways to the common nesting position NP.

Suitable structure also maintains the receptacles in the illustrated and described nesting positions NP by proper vertical spacing of the receptacles and by preventing substantial relative movement therebetween in the horizontal direction D, and perpendicular thereto. Suitable coacting nesting stop portions are provided, by the dimensions of the receptacle, to engage in nesting position on vertically aligned receptacles to maintain the nested receptacles in stable position with the upper tiering support portions either in contact or spaced apart vertically out of contact. These nesting stop portions include side wall portions 38 and 39, 58 and 59, 78 and 79, or 258 and 259; upwardly diverging side bars 100 or 120 straddling respectively bottoms 91 or 111 to locate these bottoms at proper vertical height; engaging side bars 140, 180, 200, 360 or 460; or bottom bars 154 resting on side bars 160. Substantial movement is prevented in horizontal linear direction D, and in the opposite direction, by contacting or contactable engagement of walls 39 or 70; side bars 100, 120, 140, 180, 200, 360 or 460. In FIGS. 5 and 24, horizontal movement is resisted only in the direction opposite to horizontal direction D by interengagement of walls 59 or 259. In FIGS. 15, 16, 17–22, and 23, substantial relative movement is prevented in horizontal direction D, and in the opposite direction, by the bottom portion 151, 171 or 191 having respectively downwardly extending on its bottom surface a plurality of generally parallel bars 154, 174 or 194 spaced apart in linear direction D to straddle the upwardly converging edges of side wall bars 169, 189 or 209 for restricting movement in nesting position NP in opposite directions along generally the linear direction D. In the nesting position, substantial relative movement is also restricted in the horizontal direction, extending perpendicular to direction D, by interengagement of side walls 38, 58, 78, or 258; side bars 100, 120, 140, 160, 360 or 460 straddling respectively bottom portion 91, 111, 131, 151, 351 or 451; side bars 181 on a lower receptacle straddling side bars 180 on an upper receptacle; or two of the bottom bars 193 in an upper receptacle straddling side bars 200 in a lower receptacle.

Now, it should be apparent that each of the tray forms illustrated is movable from tiering to nesting position with its load supporting portion (bottom in right side up usage) remaining parallel to the same portion in its associated like tray so that the bottom will remain horizontal and the load will not be dumped therefrom by this "shuffle type" movement; and that the tiering supporting portions on the left and right ends of the trays may be identical, as shown in FIG. 15, or may be substantially different, as shown in FIG. 26.

Various changes in details and arrangement of parts can be made by one skilled in the art without departing from either the spirit of this invention or the scope of the appended claims.

What is claimed is:

1. A receptacle adapted for tiering and nesting with other like receptacles and having a bottom portion, means defining upper edges lying generally in a plane parallel to and spaced above said bottom portion, side wall portions rigidly connecting said bottom portion and upper edge defining means, a plurality of upper tiering support portions rigid with said upper edge defining means and extending inwardly from said edge defining means, said upper edge defining means being dimensioned to permit the passing of the bottom portion of a like receptacle downwardly therethrough in vertical alignment save for interference of said upper tiering support portions, there being recesses in said bottom portion out of vertical line beneath said upper tiering support portions of a width and length to pass said upper tiering support portions when the bottom portion of an upper receptacle is moved out of vertical alignment over a lower like receptacle while maintaining the bottom portion of the upper receptacle parallel to the bottom portion of the lower receptacle, there being clearways to so pass the bottom of an upper receptacle down to a nesting position in a lower like receptacle with shifting of said two receptacles into vertical alignment, said side wall portions being so constructed and arranged that two like receptacles will nest one within another, and the above named parts permitting nesting and tiering of two like receptacles with their like parts in vertical registration one above the other.

2. A receptacle as defined in claim 1, including complementary interengaging parts of at least some of said upper tiering support portions and of said bottom portion directly vertically beneath said some upper tiering support portions and adapted to mutually engage and cooperate to prevent relative horizontal movement when two like receptacles are tiered.

3. A receptacle as defined in claim 2 wherein said interengaging formations include an upstanding projection on each of said upper tiering support portions and there being an opening in each bottom portion adapted to receive said projection.

4. A receptacle as defined in claim 1, there being two sets of said recesses in said bottom portion, one set in one direction from said vertical line beneath said upper tiering support portions, and the other set in the opposite direction.

5. A receptacle as defined in claim 1 including complementary interengaging formations on said upper tiering support portions and on said bottom portion directly vertically beneath said upper tiering support portions, said formations on said upper tiering support portions being upstanding projections spaced inwardly from said side wall portions, said formations on said bottom portions being eyelets formed of wire, and said recesses being clear spaces provided in said bottom portion on horizontally opposite sides of each eyelet.

6. A receptacle as defined in claim 1 wherein said bottom portion is generally rectangular, said upper tiering support portions and said bottom recesses are provided at one end of said bottom portion on opposite sides thereof, and said upper edge defining means includes at the other end of said bottom portion other structure cooperating with said upper tiering support portions to hold an upper receptacle in substantially level position when tiered above a lower like receptacle.

7. A receptacle adapted for tiering and nesting with other like receptacles and having a bottom portion, means defining upper edges lying generally in a plane parallel to and spaced above said bottom portion, side wall portions rigidly connecting said bottom portion and upper edge defining means, a plurality of upper tiering support portions rigid with said upper edge defining means and extending inwardly from said edge defining means, said upper edge defining means being dimensioned to permit the passing of the bottom portion of a like receptacle downwardly therethrough in vertical alignment save for interference of said upper tiering support portions, there being recesses in said bottom portion out of vertical line beneath said upper tiering support portions of a width and length to pass said upper tiering support portions when the bottom portion of an upper receptacle is moved out of vertical alignment over a lower like receptacle while maintaining the bottom portion of the upper receptacle parallel to the bottom portion of the lower receptacle, there being clearways to so pass the bottom of an upper receptacle down to a nesting position in a lower like receptacle, said side wall portions being so constructed and arranged that two like receptacles will nest one within another, and the above named parts permitting tiering of two like receptacles with their like parts in vertical registration one above the other.

8. A receptacle, as set forth in claim 7, with said side wall portions being two parallel spaced apart portions, said bottom portion having a dimension generally perpendicular to said parallel wall portions greater than the span of the outside of said two wall portions, said recesses and clearways including parallel slots in said bottom portion, and the dimensions of said receptacle permitting said slots in an upper receptacle to telescope down over said two wall portions of a lower receptacle into a nesting position.

References Cited in the file of this patent

UNITED STATES PATENTS

| | | |
|---|---|---|
| 2,684,766 | Blom | July 27, 1954 |
| 2,742,181 | Jarund | Apr. 17, 1956 |
| 2,782,936 | Lockwood | Feb. 26, 1957 |
| 2,950,825 | Averill | Aug. 30, 1960 |